US012781638B2

(12) United States Patent
Lemonnier et al.

(10) Patent No.: US 12,781,638 B2
(45) Date of Patent: Nov. 3, 2026

(54) SEAL FOR A TURBOMACHINE

(71) Applicant: SAFRAN AIRCRAFT ENGINES, Paris (FR)

(72) Inventors: Jérôme Claude Georges Lemonnier, Moissy-Cramayel (FR); Franck Davy Boisnault, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 19/483,781

(22) PCT Filed: May 3, 2024

(86) PCT No.: PCT/FR2024/050586

§ 371 (c)(1),
(2) Date: Nov. 12, 2025

(87) PCT Pub. No.: WO2024/236241

PCT Pub. Date: Nov. 21, 2024

(65) Prior Publication Data

US 2026/0117665 A1 Apr. 30, 2026

(30) Foreign Application Priority Data

May 12, 2023 (FR) ........................................ 2304750

(51) Int. Cl.
*F01D 11/02* (2006.01)

(52) U.S. Cl.
CPC ...... *F01D 11/025* (2013.01); *F05D 2250/181* (2013.01)

(58) Field of Classification Search
CPC .... F01D 11/025; F01D 11/02; F05D 2250/18; F05D 2250/181
See application file for complete search history.

(56) References Cited

U.S. PATENT DOCUMENTS 8,939,705 B1 1/2015 Lee et al.
9,151,175 B2* 10/2015 Tham ...................... F01D 5/187
(Continued)

FOREIGN PATENT DOCUMENTS

CN 104632297 A 5/2015
CN 112437832 A 3/2021
(Continued)

OTHER PUBLICATIONS

International Search Report and Written Opinion with English translation issued in International Application No. PCT/FR2024/050586, mailed Sep. 9, 2024 (13 pages).
(Continued)

*Primary Examiner* — Michael L Sehn
(74) *Attorney, Agent, or Firm* — Bookoff McAndrews, PLLC

(57) ABSTRACT

A seal configured to provide a predefined clearance between the seal and an outer surface of a rotor mounted rotatably about an axis A disposed opposite the seal, the seal being characterized in that the inner surface of each inner ring segment includes a plurality of patterns hollowed out from the inner surface of the inner ring segment, the plurality of patterns including at least:

- a first pattern having a longilineal shape extending along a diagonal direction with respect to the axial direction; and
- a second pattern including a first part extending along the same diagonal direction as the first pattern, and a second part extending along the circumferential direction.

11 Claims, 4 Drawing Sheets

(56) References Cited

U.S. PATENT DOCUMENTS

| | | | | |
|---|---|---|---|---|
| 9,243,511 | B2 * | 1/2016 | Lee | F01D 25/24 |
| 10,190,431 | B2 * | 1/2019 | Bidkar | F16J 15/447 |
| 2018/0372229 | A1 | 12/2018 | Bidkar et al. | |
| 2021/0301925 | A1 | 9/2021 | Grover et al. | |

FOREIGN PATENT DOCUMENTS

| | | | |
|---|---|---|---|
| EP | 1312761 | B1 | 5/2003 |
| FR | 2832180 | A1 | 5/2003 |

OTHER PUBLICATIONS

Preliminary Search Report issued in French Application No. 2304750, mailed Sep. 29, 2023 (2 pages).

* cited by examiner

[Fig. 1]
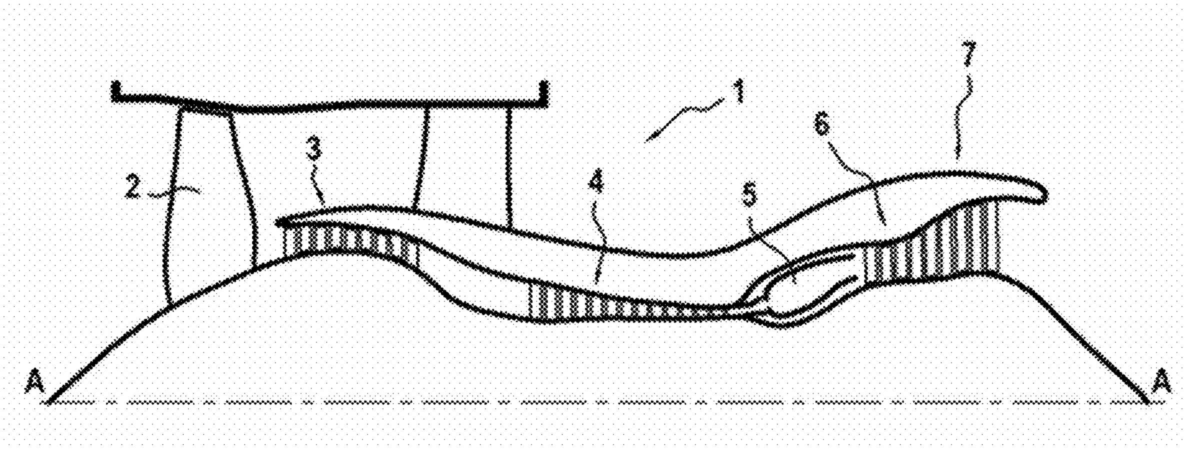
[Fig. 2]
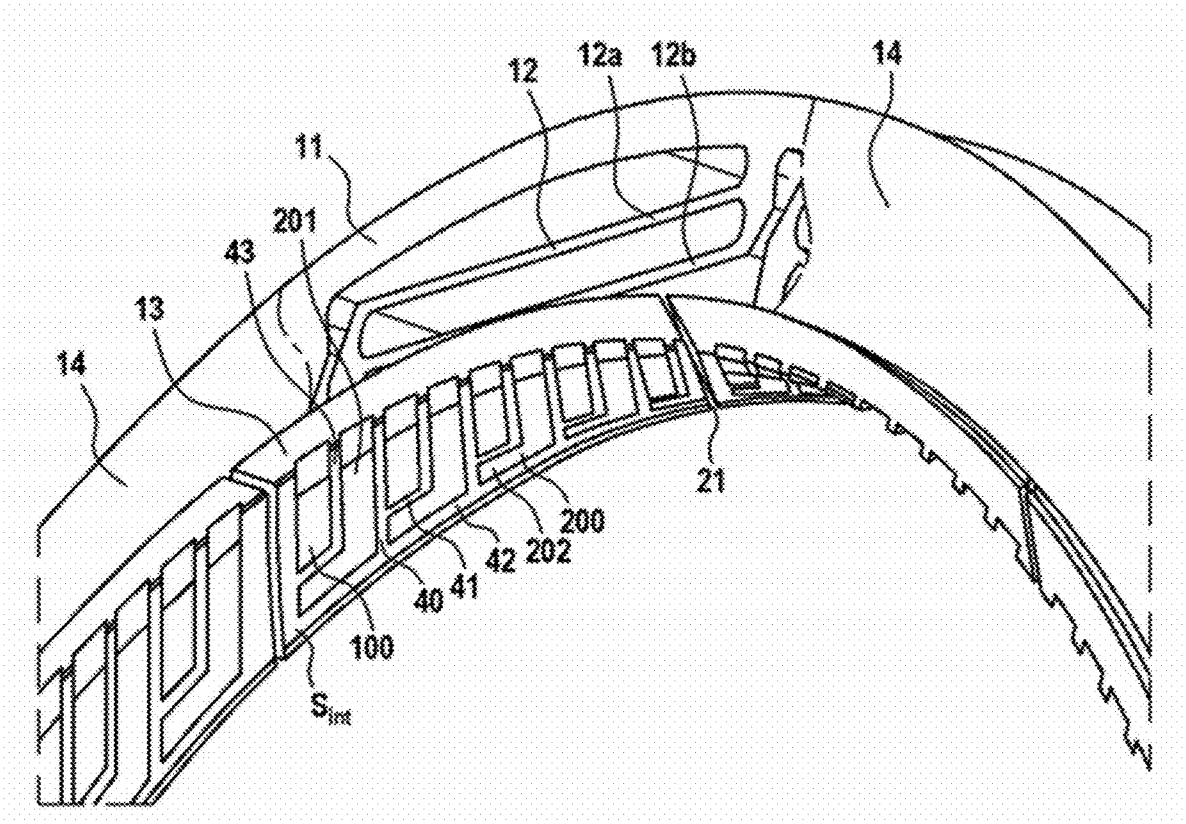

[Fig. 3]
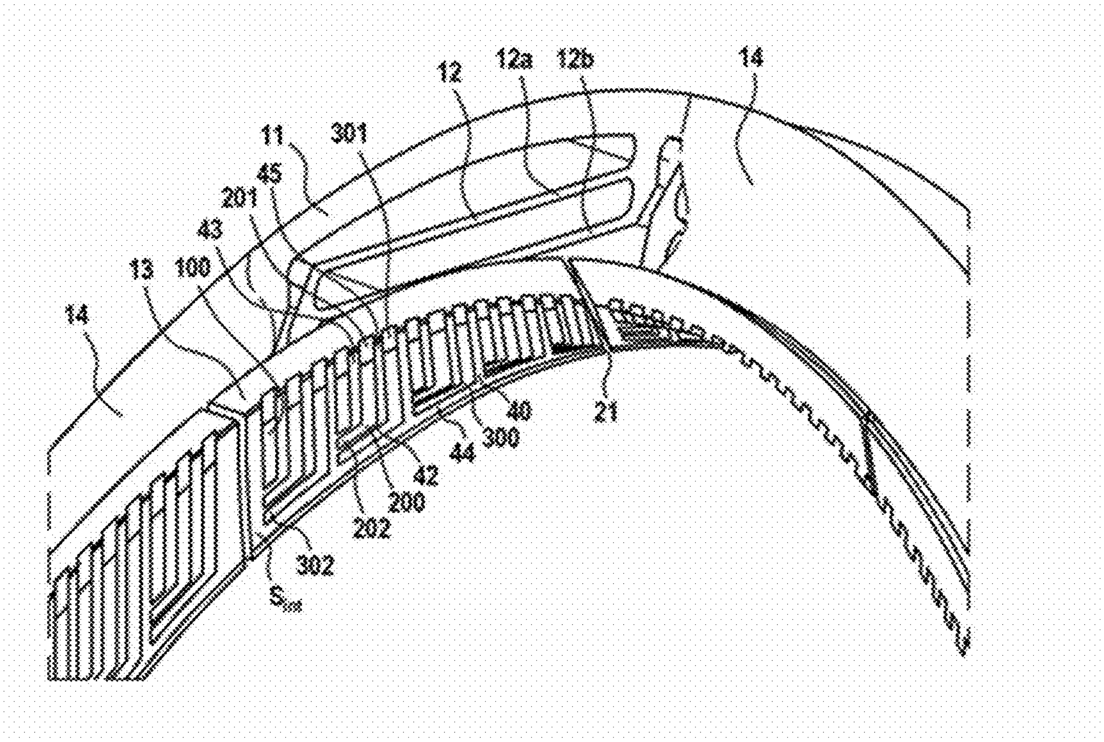
[Fig. 4]
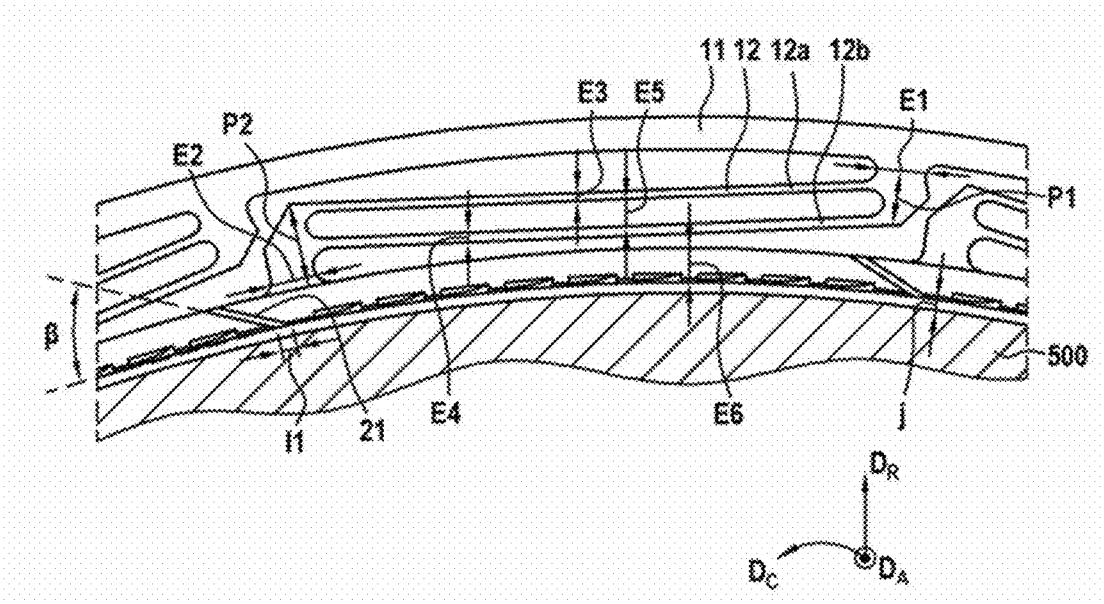

[Fig. 5]
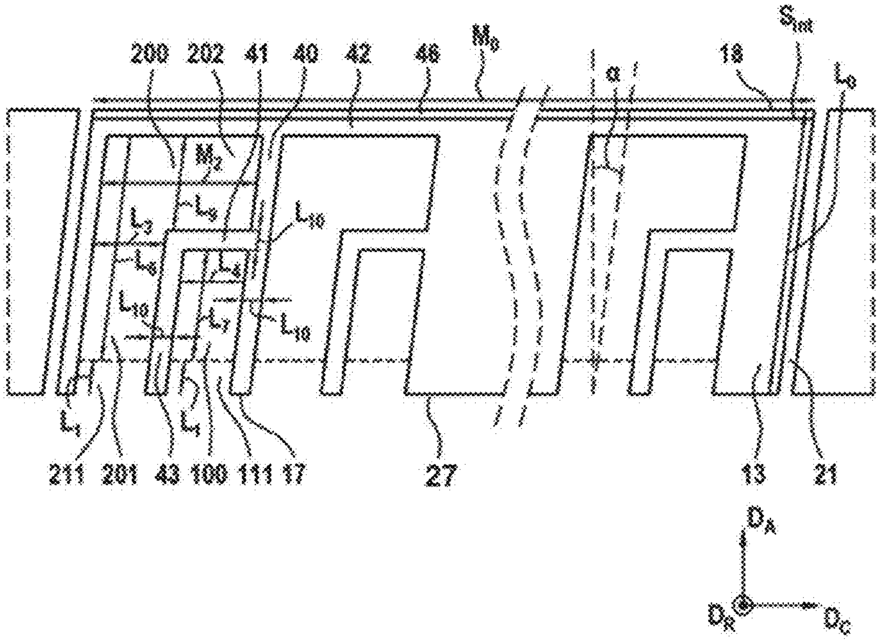
[Fig. 6]
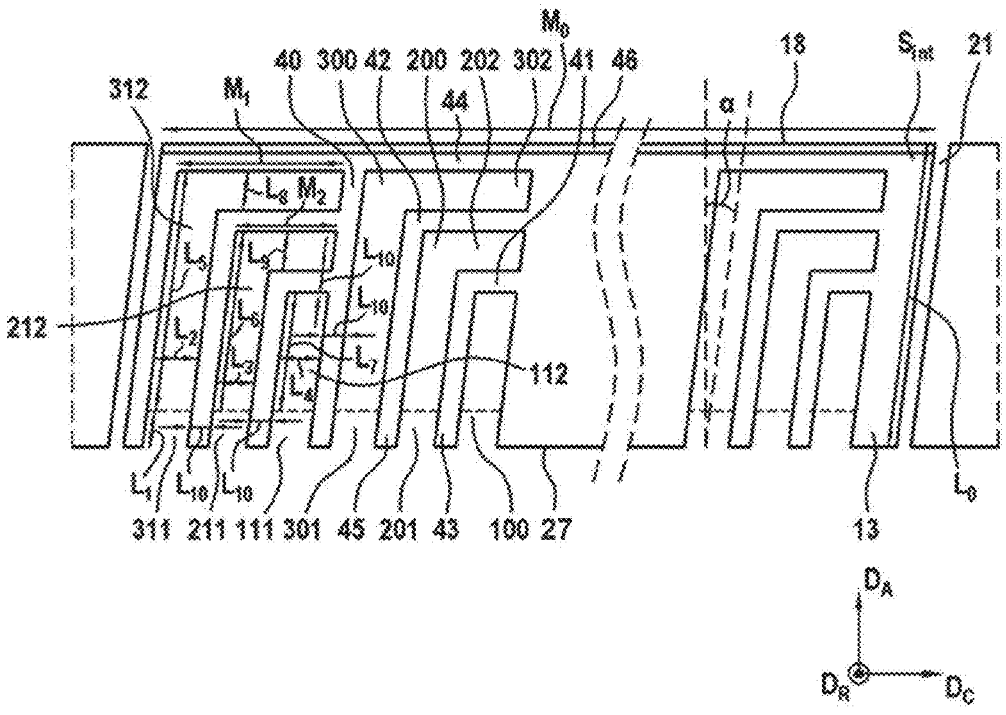

[Fig. 7]
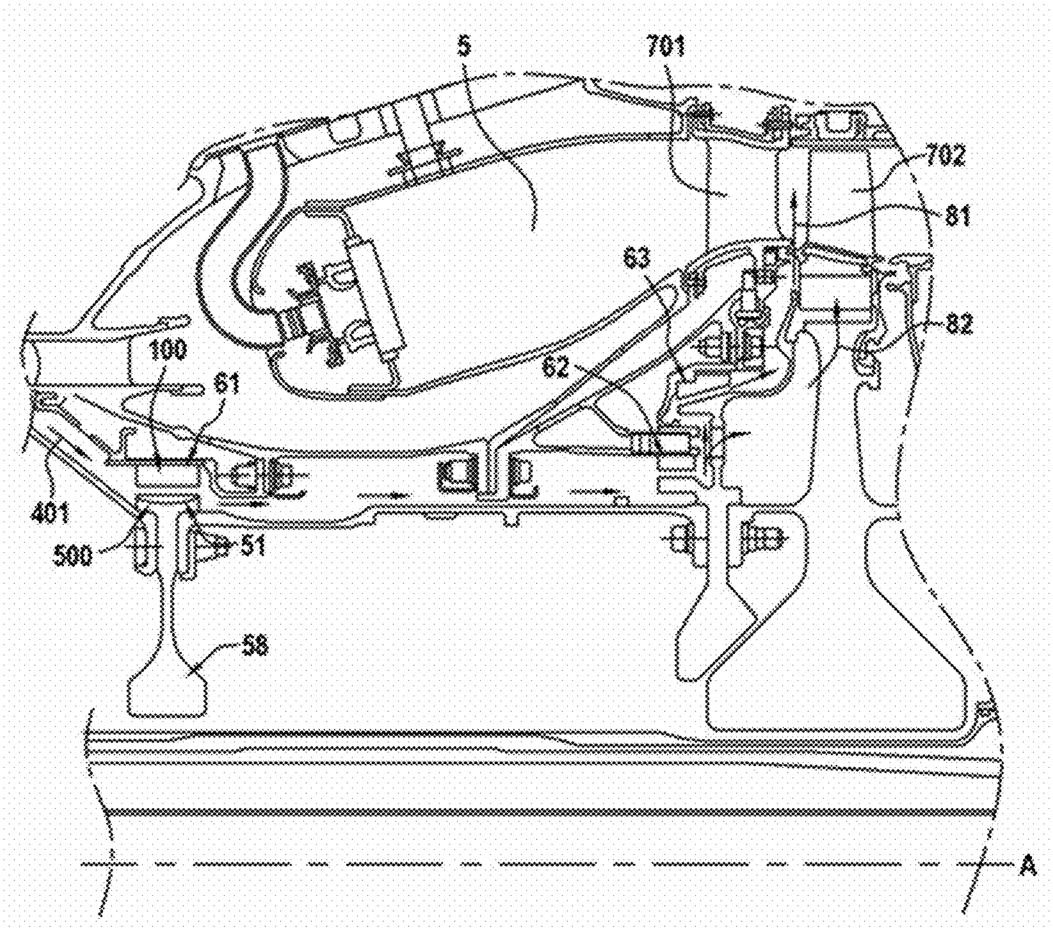

SEAL FOR A TURBOMACHINE

CROSS-REFERENCE TO RELATED APPLICATIONS

This is a National Stage Application under 35 U.S.C. § 371 of International Application No. PCT/FR2024/050586, filed May 3, 2024, which claims priority to French Application No. 2304750, filed on May 12, 2023, the entireties of which are incorporated herein by reference.

TECHNICAL FIELD

This summary relates to a particular seal, and also to a turbomachine comprising such a seal.

PRIOR ART

The design of the ventilation circuits of an aeronautical turbomachine is complicated and represents a potential loss of performance.

Specifically, the turbomachine performs better when it operates at high temperature. However, its component materials then require more cooling. The cooling is generally done by drawing off a part of the relatively cool air of the air path, which adversely affects the overall performance.

Moreover, the cooling circuit requires the production of a complex architecture to allow the cooling air to reach the blades to be cooled from the place at which it is drawn off.

To make sure that the air circuit is not supplied with more cooling air than necessary, and thus does not have a greater adverse effect on the turbomachine performance than necessary, labyrinth seals are generally disposed at the air drawing locations.

Such seals make it possible to ensure a controlled passage of air at the locations at which they are disposed. The conventional architecture of labyrinth seals comprises lips disposed facing abradable elements which have a cellular structure of honeycomb type.

This type of seal does however have the disadvantage that the wear of the lips by friction against the abradable elements increases the clearance of the seal on the scale of the seal's lifetime, and thus allows a greater passage of air, which ultimately leads to too much air being drawn off and therefore a loss of turbomachine performance.

This is why a requirement persists for seals that wear out less over their lifetime.

SUMMARY OF THE INVENTION

This invention mainly aims to meet this requirement.

For this, provision is made for a seal configured to provide a predefined clearance between said seal and an outer surface of a rotor mounted rotatably about an axis A disposed opposite the seal, the axis A defining an axial direction, the seal extending circumferentially around the axis A and comprising a plurality of seal segments circumferentially distributed around the axis A, each seal segment comprising an inner ring segment connected to an outer ring segment by a return member, the seal being characterized in that the inner surface of each inner ring segment comprises a plurality of patterns hollowed out from the inner surface of the inner ring segment, the plurality of patterns comprising at least:

- a first pattern having a longilineal shape extending along a diagonal direction with respect to the axial direction from the upstream edge of the inner ring segment and all the way to a first non-hollowed-out portion of the inner surface of the inner ring segment; and
- a second pattern comprising a first part extending along the same diagonal direction as the first pattern from the upstream edge of the inner ring segment and all the way to a second non-hollowed-out portion of the inner surface of the inner ring segment axially closer to the downstream edge of the inner ring segment than the first non-hollowed-out portion, the first part of the second pattern being separated in the circumferential direction from the first pattern by a third non-hollowed-out-portion of the inner surface of the inner ring segment, the second pattern further comprising a second part extending along the circumferential direction between the first non-hollowed-out portion and the second non-hollowed-out portion of the inner surface of the inner ring segment.

Such a seal architecture is radically different from a labyrinth seal.

However, the inner surface of the inner ring segment does indeed provide aerodynamic sealing while ensuring a predefined clearance with the opposite surface.

It is understood that the sealing involved here is not strict sealing in the sense that the air could not pass through the seal, but relative sealing, the aim of the seal being to let a defined amount of air pass through.

The "circumferential distribution" of the seal segments should be understood to mean that each seal segment defines a portion of the circumference of the seal, and that the set of seal segments makes it possible to obtain the full seal.

In an embodiment, the circumferential distribution is regular, and each seal segment thus represents an equal portion of the circumference of the seal.

It is understood that the predefined clearance is a "target" clearance, and that it is possible for the clearance to vary slightly around the predefined clearance value under the conditions of use of the seal. When the seal is in its equilibrium position, the predefined clearance makes it possible to ensure that the air flow traversing the seal is the desired air flow. However, if the clearance is not in its equilibrium position, the seal architecture makes it possible to bring it into that position.

More precisely, the inner surface of the inner ring segment comprising the patterns interacts with the incident air flow such that:

- if the clearance decreases, the pressure of the air between the seal surface and the opposite surface increases, so as to push back the seal and thus bring it back to the predefined clearance; and
- if the clearance increases, the pressure of the air between the seal surface and the opposite surface decreases, so that a return element connected to the seal makes it possible to bring the seal back to the predefined clearance.

This aerodynamic equilibrium makes it possible to avoid, at any time, the inner surface of the inner ring segment coming into contact with the opposite surface, and in this the seal differs from labyrinth seals. This dispenses with the wear problem which can be encountered for conventional labyrinth seals.

Moreover, the patterns for which provision is made in the thickness of the inner surface of the inner ring segment make it possible to improve the aerodynamic behavior of the seal, and this even by comparison with an inner ring segment inner surface that might comprise different patterns, for example solely diagonal patterns.

In an embodiment, the clearance between the inner surface of the inner ring segment and the radially opposite surface can be between 0.1 and 1.0 mm or between 0.5 mm and 1.0 mm.

The patterns hollowed out from the inner surface of the inner ring segment make it possible to modify the behavior of the seal, particularly by further increasing the pressure exerted by the air on the inner surface of the inner ring segment when this latter approaches the opposite surface.

This makes the contact between the inner surface of the inner ring segment and the radially opposite surface even more unlikely, thus reducing the risk of wear to the seal.

In particular, the disposition chose for the first pattern and the second pattern specifically make it possible to increase the pressure under the seal yet further, by comparison with other pattern geometries.

In particular, the inventors have found that the proposed geometry for the patterns increases the pressure force applied by the air under the inner surface of the inner ring segment by comparison with inner ring segments comprising only diagonal patterns, and without patterns with an "L" shape as the second patterns of the invention.

The patterns are said to be "hollowed out from the inner surface of the inner ring segment", since it must be understood that the patterns form a relief in the radial direction of the ring segment, i.e. the direction perpendicular to the axis A, and from the inner surface of the inner ring segment.

In an embodiment, the axis A can be the main axis of a turbomachine.

In an embodiment, the inner surface of the inner ring segment further comprises at least a third pattern comprising a first part extending along the same diagonal direction as the first pattern from the upstream edge of the inner ring segment and all the way to a fourth non-hollowed-out portion of the inner surface of the inner ring segment axially closer to the downstream edge of the inner ring segment than the second non-hollowed-out portion, the first part of the third pattern being separated in the circumferential direction from the first part of the second pattern by a fifth non-hollowed-out portion of the inner surface of the inner ring segment, the third pattern further comprising a second part extending along the circumferential direction between the second non-hollowed-out portion and the fourth non-hollowed-out portion of the inner surface of the inner ring segment.

This embodiment makes it possible to further improve the pressure applied by the air under the inner surface of the inner ring segment in operation, when the clearance of the seal is less than the target clearance.

This ensures a more responsive behavior of the seal, and therefore reduces the risk of the inner ring segment coming into contact with the surface of the rotor.

The inclination quantifying the "diagonal" characteristic of the patterns is understood to mean the angle defined between the direction in which the length of a pattern extends and the axial direction.

In an embodiment, the patterns extend along a diagonal direction, having an angle of inclination with respect to the axial direction, this angle of inclination being greater than or equal to 30°.

The angle of inclination of the patterns makes it possible, on the one hand, to inscribe more patterns or larger patterns on the surface of an inner ring segment of given dimensions.

In an embodiment, the angle of inclination of the patterns is between 30° and 60°, or between 30° and 45°.

Specifically, this makes it possible to moreover ensure that the air flow, which may have a tangential velocity due to the rotation of several elements with which it may be in contact, enters the pattern without experiencing an excessive discontinuity.

Preferably, the angle of inclination is oriented in the same direction as the tangential velocity of the air flow, or else in the direction of rotation of the opposite surface with respect to the inner ring segment.

In an embodiment, the surface opposite the seal is a surface of a rotor mounted rotatably about the axis A, for example the rotor of a high-pressure turbine of an aeronautical turbomachine. In an embodiment, the patterns may be inclined in the same direction as the direction of rotation of the rotor.

This ensures that the orientation of the patterns are in the direction of the tangential velocity of the air traversing said patterns, which improves the overall performance of the seal.

In an embodiment, the second part of a pattern comprising two parts, i.e. a second pattern, or where applicable a third pattern, may extend from the first part of this pattern in the circumferential direction, in the same direction as the direction of rotation of the rotor.

This embodiment ensures that the air circulating in the pattern receives an even higher dynamic pressure, which further increases the pressure applied on the inner surface of the inner ring segment, thus increasing the responsiveness of the seal.

In an embodiment for a pattern that comprises two parts, of which it is said that the second part extends along the circumferential direction, it must be understood that the second part may, in the circumferential direction, have a greater dimension than that of the first part.

Such a pattern may also be said to be "L"-shaped, it being understood that the incident air flow traversing the seal travels along such an "L" from top to bottom, i.e. the air enters through the first part of the pattern having a smaller extent in the circumferential direction than the second part of the pattern.

However, due to the diagonal direction of the first part of such a pattern, it must be understood that the pattern is not strictly limited to an L shape, the first part of which would be perpendicular to the second.

In an embodiment, the inner surface of an inner ring segment may comprise a repetition in the circumferential direction of several sets of patterns, each set of patterns comprising a first pattern, a second pattern and optionally a third pattern as described above.

Each set of patterns is then separated from another set, or optionally from the circumferential end of the inner surface of the inner ring segment by a non-hollowed-out portion of the inner surface.

In an embodiment, the inner surface of a ring segment comprises between 3 and 10 repetitions of a set of patterns, each set of patterns comprising a first pattern, a second pattern and optionally a third pattern as described above, each set of patterns being separated from the previous one or from the following one by a non-hollowed-out portion of the inner surface.

Where applicable, a pattern may be separated from a circumferential end of the inner surface of the inner ring segment by a non-hollowed-out portion.

The depth of a pattern is understood to mean the distance between the non-hollowed-out inner surface of the inner ring segment and the surface of the pattern, measured perpendicularly to the surface of the inner ring segment, i.e. along the radial direction.

In an embodiment, the patterns have a flat portion over which the depth does not vary, and it will be considered that the depth of this flat portion is the depth of the pattern. If the patterns do not have such a flat portion or if they have more than one flat portion, the average depth of the pattern will be referred to as the pattern depth.

The embodiments now described make it possible to ensure a faster return of the seal to its predefined clearance, and therefore to its equilibrium position by increasing the pressure radially under the inner surface when the clearance becomes smaller than the predefined clearance.

Thus, these embodiments further ensure that the inner surface of the inner ring segment does not come into contact with the opposite surface in the intended or even accidental operating modes.

In an embodiment, the patterns have a flat downstream pattern area of constant and non-zero depth, and an upstream pattern area in which the depth varies decreasingly, while remaining greater than the constant depth of the downstream pattern area.

More precisely, when a pattern comprises a first and a second part, it is preferable for the whole second part to have a constant depth, i.e. to be located in the downstream area of the pattern, and for the first part to have an upstream area, the depth of which varies decreasingly and a downstream area of constant depth.

In such an embodiment, the depth of the second part of the pattern is identical to the depth of the downstream area of the first pattern part.

The downstream area plays the general role of the pattern which is that of increasing the pressure on the inner surface of the inner ring segment when the clearance is lower than the predefined clearance.

In an embodiment, the upstream area of each pattern may have a rounded, i.e. convex shape.

Alternatively, the upstream area may have a depth which decreases regularly, i.e. in the form of a slope.

Preferably, the maximum depth of the upstream area, located on the upstream edge of the inner ring segment, can be greater than or equal to 0.4 mm.

The upstream area makes it possible to provide a gentle pressure gradient at the entry of the seal. This makes it possible to improve the effectiveness of the seal overall.

Moreover, since the patterns are separated by a non-hollowed-out portion of the inner surface of the inner ring segment and since the depth at the exit of the downstream part of the pattern is non-zero, this embodiment ensures that the air travelling through the patterns meets a wall directed in the radial direction at the end of the pattern.

This is true for a first pattern, for a second pattern and where applicable for a third pattern.

These walls ensure that the force exerted by the air radially under the inner surface of the inner ring segment is directed in the radial direction, and this independently of its tangential velocity, which increases the performance of the seal.

In an embodiment, each pattern comprises a flat downstream pattern area of constant and non-zero depth and an upstream pattern area in which the depth varies decreasingly, while remaining greater than the constant depth of the downstream pattern area.

In an embodiment, the depth of the downstream area of the pattern may be between 0.5 times and 2.5 times the predefined clearance for the seal.

The inventors have specifically found that these depth values ensure an excellent distribution of the pressures in the seal, which improves the effectiveness of the seal.

To describe the preferred dimensions of the patterns, or where applicable the pattern parts, the expression “the width of the inner surface of the inner ring segment travelled in the direction of the length” will be used.

Within the meaning of the invention, the expression “the width of the inner surface of the inner ring segment travelled in the direction of the length of the patterns” is intended to describe the dimension of the inner surface of the inner ring segment travelled in a direction offset from the axial direction by an angle equal to the inclination of the patterns.

Thus, the width of the inner surface of the inner ring segment travelled in the direction of the length of the patterns is equivalent to the width of the inner surface of the inner ring segment travelled in the axial direction divided by the cosine of the angle of inclination of the patterns.

In an embodiment, the length of the upstream area of the patterns may be between 5% and 15% of the width of the inner surface of the inner ring segment travelled in the direction of the length of the patterns.

In an embodiment, the length of the first pattern, which is also the length between the upstream edge of the ring segment and the first non-hollowed-out portion, may be between 50% and 80% of the width of the inner surface of the inner ring segment travelled in the direction of the length of the patterns.

In particular, if there are no other patterns than first and second patterns, it is preferable for the length of the first part of the second pattern to be between 60% and 80% of the width of the inner surface of the inner ring segment travelled in the direction of the length of the patterns.

If there are third patterns, it is preferable for the length of the first part of the second pattern to be between 50% and 75% of the width of the inner surface of the inner ring segment travelled in the direction of the length of the patterns.

In an embodiment, the length of the first part of the second pattern, which is also the length between the upstream edge of the ring segment and the second non-hollowed-out portion, to be between 60% and 95% of the width of the inner surface of the inner ring segment travelled in the direction of the length of the patterns.

In particular, if there are no other patterns than first and second patterns, it is preferable for the length of the first part of the second pattern to be between 70% and 95% of the width of the inner surface of the inner ring segment travelled in the direction of the length of the patterns.

If there are third patterns, it is preferable for the length of the first part of the second pattern to be between 60% and 80% of the width of the inner surface of the inner ring segment travelled in the direction of the length of the patterns.

If third patterns are present, the length of the first part of the third pattern, which is also the length between the upstream edge of the ring segment and the fourth non-hollowed-out portion, may be between 70% and 95% of the width of the inner surface of the inner ring segment travelled in the direction of the length of the patterns.

In an embodiment, the width in the circumferential direction of the first patterns or of the first part of the second patterns, may be between 0.5 and 1.5 cm.

Preferably, the width of the first pattern is between 85% and 95% of the width of the first part of the second pattern.

If third patterns are present, the width of the first part of the second pattern may be between 85% and 95% of the width of the first part of the third pattern.

In an embodiment, the extent in the circumferential direction of the second part of the second pattern is such that it extends all the way to the continuation of the circumferential end of the first pattern.

In other words, the width of the non-hollowed-out portion between the first pattern and the circumferentially adjacent pattern is equal to the width of the non-hollowed-out portion between the second part of the second pattern and the circumferentially adjacent pattern.

In an embodiment in which third patterns are present, the extend in the circumferential direction of the second part of the third pattern is such that it extends all the way to the continuation of the circumferential end of the first pattern.

In other words, the width of the non-hollowed-out portion between the first pattern and the circumferentially adjacent pattern is equal to the width of the non-hollowed-out portion between the second part of the third pattern and the circumferentially adjacent pattern.

In an embodiment, the width of the non-hollowed-out portions of the inner surface of the inner ring segment are both less than 0.2 mm, for example between 0.05 and 0.2 mm.

These dimensions make it possible to ensure the good behavior of the seal.

As described, the inner surface of the inner ring segment comprises after the second part of the last pattern a non-hollowed-out portion of the inner surface of the inner ring segment. This portion is the second or fourth non-hollowed-out portion depending on whether or not third patterns are present.

In an embodiment, this non-hollowed-out portion is separated from the downstream edge of the inner ring segment by a portion of increasing depth of the inner ring segment.

Such a profile makes it possible to reduce the heterogeneity of pressure at the exit of the seal, which reduces the risk of vibrational instability of the seal because of the wake of the air traversing it.

In an embodiment, the inner surface of the inner ring segment comprises a set of patterns repeated between 3 and 10 times identically in the circumferential direction, each set of patterns being separated from the previous one and from the next one by a non-hollowed-out portion of the inner surface of the inner ring segment.

In other words, when travelling the inner surface of the inner ring segment in the circumferential direction, an alternation of the first and second patterns, or where applicable of first, second and third patterns, is encountered.

In an embodiment, the outer ring segments form an outer shroud and the inner ring segments have ends arranged end-to-end in the circumferential direction around the axis A.

In such an embodiment, the circumferential ends of the inner ring segments may have an angle of inclination with respect to the circumferential direction between 30° and 90°.

This inclination of the circumferential ends of the inner ring segments of the seal segments makes it possible to ensure a displacement of the inner ring segments of the seal segments with respect to one another.

Specifically, during use, the radial displacement of the inner ring segments is non-uniform. An inclination of the ends of the inner ring segments makes it possible to reduce the existing clearance between two inner ring segments, thus improving the effectiveness of the seal.

In an embodiment, the seal comprises between 5 and 20 seal segments.

For reasons of mechanical strength and bulk, and to ensure the flatness of the seal surface, it would be preferable to have as many segments as possible. On the other hand, for aerodynamic reasons, it is advisable to avoid leaks, and therefore to minimize the number of seal segments. The inventors have found that such a number of seal segments was an optimal tradeoff between these two opposing effects.

In an embodiment, the outer ring segments of a seal may be a single part, for example a shroud. In other words, there is no physical separation between two circumferentially successive outer ring segments.

In an embodiment, such a shroud can be monolithic, i.e. made of a single part without connection. In such a scenario, it will be considered that an angular portion of the shroud may be considered as an outer ring segment.

In an embodiment, the seal further comprises a secondary sealing member radially disposed above the inner ring segment so as to prevent the air from axially traversing the seal radially above the inner ring segment.

Such a secondary sealing member makes it possible to ensure the sealing of the elements of the seal located radially above the inner ring segment. In other words such a secondary sealing member ensures that the only path allowing the air upstream of the seal to cross it passes radially between the inner surface of the inner ring segment and the outer surface opposite the seal.

Such a secondary member is known as such to those skilled in the art and can for example be chosen from among a brush seal, a set of tabs, or a tiling.

According to another of its aspects, the invention also relates to a turbomachine comprising at least one seal as described above.

In an embodiment, the turbomachine comprises a circuit for conveying cooling air toward a high-pressure rotor disc, the circuit for conveying cooling air comprising at least one seal described above, said circuit for conveying cooling air comprising an inlet drawing off air downstream of the last disc of the high-pressure compressor, an inlet drawing off air radially under the combustion chamber and an air outlet opening into a cooling housing of the high-pressure rotor disc and the at least one seal being disposed at one from among the positions above:

- downstream of the inlet drawing off air from the high-pressure compressor, radially under the last straightener of the high-pressure compressor;
- radially below an injector of cooling air in fluid communication with the inlet drawing off air radially under the combustion chamber;
- radially between the injector and the root of the high-pressure nozzle guide vane and disposed such as to prevent a leak of the air intended to cool the high-pressure rotor.

In an embodiment the turbomachine comprises a circuit for conveying cooling air to a high-pressure rotor disc, the circuit for conveying cooling air comprising at least one seal described above, said cooling air conveying circuit comprising an inlet drawing off air downstream of the last disc of the high-pressure compressor, an inlet drawing off air radially under the combustion chamber and an air outlet opening into a cooling housing of the high-pressure rotor and the at least one seal being chosen from among:

- the first seal downstream of the high-pressure compressor traversed by the air drawn off downstream of the last disc of the high-pressure compressor;
- the forward inner seal defining the inlet of said air intake housing and disposed below the air intake orifice;
- the forward outer seal defining the outlet of said air intake housing and disposed below the high-pressure nozzle guide vane.

For example, and according to the terminology of the field, at least one of the forward inner seal (FIS), of the forward outer seal (FOS) and/or of the first seal downstream of the high-pressure compressor (known as CDP for Compressor Discharge Pressure) can be a seal as described above.

Preferably, the seal is disposed downstream of the inlet drawing off air from the high-pressure compressor, radially under the last straightener of the high-pressure compressor and the surface opposite said seal comprises a groove filled with a clear resin.

In other words, the first seal downstream of the compressor disc (CDP) is as described above.

Reference is made to straighteners with the meaning this term usually has in the field, i.e. a set of air-straightening stator vanes.

It was found that these seals offer, by virtue of their operation, a much better lifetime than labyrinth seals, and thus ensure that the performance of the turbomachine is maintained all through its lifetime.

In an embodiment, the face opposite the seal comprises a groove filled with a resin.

In such an embodiment, the inner surface of the inner ring segment does not risk being damaged by contact with the opposite surface, even in the event of abnormal operation.

This is because it would only come into contact with the resin and not the opposite face.

In such an embodiment, the resin is preferably clear.

This allows a visual inspection of the surface opposite the seal without it being necessary to remove the resin. This results in a simplified inspection operation.

In an embodiment, the seal as described is disposed downstream of the inlet drawing the air from the high-pressure compressor, radially under the last straightener of the high-pressure compressor and the surface opposite said seal comprises a groove filled with a clear resin.

In an embodiment, the surface opposite the seal can be integrated at the tip of a rotor disc or coupled with a flyweight.

This embodiment makes it possible to ensure that the surface opposite the seal remains flat, even when the turbomachine is in operation.

A flatter surface opposite the seal makes it possible to ensure a better performance of the seal and therefore a better performance of the entire turbomachine.

BRIEF DESCRIPTION OF THE DRAWINGS

FIG. 1 shows a section view of a turbomachine.

FIG. 2 shows a plurality of seal segments in an embodiment of the invention.

FIG. 3 shows a plurality of seal segments in a different embodiment of the invention from FIG. 2.

FIG. 4 shows the depth profile along a path of the air flow traversing a seal in an embodiment of the invention.

FIG. 5 shows the inner surface of an inner ring segment in an embodiment of the invention.

FIG. 6 shows the inner surface of an inner ring segment in a different embodiment of the invention from that of FIG. 5.

FIG. 7 shows a section view of a turbomachine provided with seals as described according to an embodiment of the invention.

DESCRIPTION OF THE EMBODIMENTS

The invention is now described by means of figures, present for descriptive purposes, illustrates certain embodiments of the invention and which must not be interpreted as limiting this latter.

In particular, the figures are neither to scale nor even to relative scale but represent elements with dimensions that make it possible to understand the relative positioning thereof.

FIG. 1 represents, in section along a vertical plane passing through its main axis A, a bypass turbojet engine 1. It includes from upstream to downstream along the circulation of the air flow, a fan 2, a low-pressure compressor 3, a high-pressure compressor 4, a combustion chamber 5, a high-pressure turbine 6, and a low-pressure turbine 7.

In this application, the relative positioning terms, for example “upstream”, “downstream”, “inner” and “outer” will be understood with respect to the horizontal axis A of the casing defining the axial direction, travelled in the direction of flow of the main and secondary air flows of the turbomachine.

Thus, a so-called “upstream” element will be traversed before a so-called “downstream” element and a so-called “inner” element will be closer to the axis A than an “outer” element.

In this application, it is understood that the axial direction DA extends as the direction of the main axis A of the turbomachine; the circumferential direction $D_C$ is that forming a circle around the axial direction DA; and the radial direction DR, defines a radius of the circle formed by the circumferential direction $D_C$ and having as center the axial direction DA.

FIG. 2 shows a seal in an embodiment of the invention.

For reasons of representation, the outer surface opposite the seal is not shown on FIG. 2.

In an embodiment and as can be observed on FIG. 2, the set of seal segments, and more precisely the inner and outer ring segments, makes it possible to give the entire seal an annular shape.

FIG. 2 also depicts the circumferential space between two seal segments 21, and shows that the return member 12 may comprise an outer arm 12*a* and an inner arm 12*b*.

The return member 12 will be described in more detail with FIG. 4.

FIG. 1 further illustrates a secondary sealing member 14 as described above. The secondary sealing member may comprise a plurality of circumferentially distributed elements.

Although the representation of the secondary sealing member 14 is truncated on FIG. 1 to make visible the elements 11 and 12, the secondary sealing member 14 covers the entire circumference of a seal as described above.

For example, there can be as many, more or fewer secondary sealing member portions than there are seal segments.

FIG. 2 describes an embodiment in which the inner surface $S_{int}$ of the inner ring segment 14 comprises only first patterns 100 and second patterns 200.

On FIG. 2 the non-hollowed-out portions of the inner surface $S_{int}$ of the inner ring segment 13 can also be seen.

More precisely, the FIG. 2 shows the first non-hollowed-out portion 41 in the axial direction between the first pattern 100 and the second part 202 of the second pattern 200; the second non-hollowed-out portion 42 between the second pattern 200 and the downstream edge of the inner ring segment, and a non-hollowed-out portion 40 between a set of two patterns and the one that is adjacent in the circumferential direction.

FIG. 3 shows a view similar to that of FIG. 2 and in which the inner ring segment comprises first 100, second 200, and third 300 patterns. The patterns 100, 200 and 300 as well as their dimensions will be described in more details with FIGS. 5 and 6.

FIG. 4 shows a section view of the elements visible on FIG. 1.

FIG. 4 moreover shows the surface 500 opposite the seal, and also specifies a certain number of dimensions which will be described and which represent the preferred embodiment of the invention.

FIG. 4 also shows the main dimensions in relation to which the different elements of a seal according to the invention are described.

Among them, the axial direction DA which is understood as the direction around which the seal extends; the circumferential direction $D_C$ in which the seal extends, and forming a circle around the axial direction DA; and the radial direction DR, which defines a radius of the circle formed by the circumferential direction $D_C$ and having as center the axial direction DA.

The elements E1 and P1 characterize the fastening of the return member 12 to the outer ring segment 11.

In an embodiment E1, the connecting surface between the return member 12 and the outer ring segment 11 can be greater than or equal to 4 mm, for example between 4 mm and 8 mm.

In an embodiment, P1 the thickness of the portion of the return member 12 related to the ring segment 11, and measured from the inner surface of the outer ring segment 11 can be greater than or equal to 5 mm, for example between 5 mm and 10 mm.

In an embodiment, the return member can be divided into an outer arm 12*a* and an inner arm 12*b*. This ensures a lower mass of the whole device, while conferring fully satisfactory return and flexibility properties on the whole.

For example the thickness E3 of the outer arm 12*a* can be greater than or equal to 0.7 mm, for example between 0.7 mm and 2 mm.

For example, the thickness E4 of the inner arm 12*b* can be greater than or equal to 0.7 mm, for example between 0.7 mm and 2 mm.

In an embodiment, the thickness E3, E4 of the outer 12*a* and inner 12*b* arms is equal.

In an embodiment, the thickness E5 of the return member 12 can be greater than or equal to 2.5 mm for example between 2.5 mm and 5.0 mm.

The thickness E5 of the return member 12 is understood, in the scenario in which it is divided into two thinner arms, to be the distance between the inner surface of the inner arm and the outer surface of the outer arm.

The precise values chosen from E3, E4 and E5 make it possible to precisely dimension the return force of the return member 12, and thus to influence the operation of the seal, as well as the definition of the predefined clearance j.

In an embodiment E2, the connecting surface between the return member 12 and the inner ring segment 13 can be greater than or equal to 4 mm, for example between 4 mm and 8 mm.

In an embodiment, P2 the thickness of the portion of the return member 12 related to the inner ring segment 13, and measured from the outer surface of the inner ring segment 13 can be greater than or equal to 5 mm, for example between 5 mm and 10 mm.

In an embodiment, the thickness E6 of the inner ring segment 13 may be between 2.0 mm and 5.0 mm.

Such dimensions represent an excellent tradeoff between the possibility of providing hollowed-out patterns of sufficient size and of a reduced weight of the whole seal.

In an embodiment, the clearance j between the inner surface of the inner ring segment 13 and the radially opposite surface 500 may be between 0.1 and 1.0 mm or between 0.5 mm and 1.0 mm.

This clearance j corresponds to a target air flow through the turbomachine fans for engine cooling applications.

FIG. 4 also identifies the angle of inclination ß of the radial ends of the inner ring segment 13 with the circumferential direction. This inclination ensures that a displacement of the inner ring segments with respect to one another is possible, thus reducing the spacing between two segments during the operation.

FIG. 2 also marks the spacing between two seal segments 11 which is preferably less than or equal to 0.3 mm.

This spacing makes it possible to ensure a minimization of the leaks while leaving enough space to allow the inner ring segments to move relatively with respect to one another.

Specifically, the inner ring segments 13 can be stressed slightly differently with respect to one another, and it is important that they have a certain degree of freedom to be able to accommodate this difference in stress.

FIG. 5 shows a view of the inner surface $S_{int}$ of the inner ring segment 13, which bears the patterns and in the scenario, illustrated in FIG. 2, in which the surface of the inner ring segment comprises only the first of the second patterns thereof.

In an embodiment, the inner surface $S_{int}$ of the inner ring segment comprises an alternation of first patterns 100 and of second patterns 200.

The first pattern extends in a diagonal direction, offset by an angle of inclination a with the axial direction DA.

The first patterns 100 extend between the upstream edge 17 of the inner ring segment 13 and a first non-hollowed-out portion 41 of the inner surface of the inner ring segment.

The second patterns 200 comprise a first part 201 and a second part 202.

The first part 201 of the second pattern 200 extends between the upstream edge 17 of the inner ring segment 13 and a second non-hollowed-out portion 42 of the inner surface of the inner ring segment closer to the downstream edge 18 of the inner ring segment than the first non-hollowed-out portion 41.

Moreover, the first part 201 of the second pattern 200 is separated from the first pattern 100 in the circumferential direction by a third non-hollowed-out portion 43 of the inner surface of the inner ring segment.

Moreover, the first pattern is, in the axial direction, separated from the second part 202 of the second pattern 200 by the first non-hollowed-out portion 41.

In an embodiment, which is that shown on FIG. 5, the second part 202 of the second patterns 200 extends in the circumferential direction $D_C$ all the way to the continuation of the circumferential end of the first pattern 100.

Specifically, the width of the non-hollowed-out portion 27 between the first pattern 100 and the circumferentially adjacent pattern is equal to the width of the non-hollowed-out portion 27 between the second part 202 of the second pattern 200 and the circumferentially adjacent pattern.

In other words, the second portion 202 of the second pattern is a portion coming axially downstream of the entirety of the first pattern 100.

In an embodiment, which is that shown, the non-hollowed-out portions have identical widths.

In an embodiment, the width of the non-hollowed-out portions is less than or equal to 2 mm, for example between 0.05 and 2.0 mm.

It is understood that the width is the smallest dimension of the non-hollowed-out portions, i.e. the measurement of the circumferential extension for the portions 40 and 43 and the extension in the axial direction for the portions 41 and 42.

FIG. 5 moreover shows, in dotted lines the separation between the upstream area 111 and the downstream area 112 of the first patterns 100, and between the upstream area 211 and the downstream area 212 of the second patterns 200.

In an embodiment the depth of this upstream area decreases between the upstream edge 17 and the downstream edge of the patterns in which the depth remains constant.

For example, the depth of the upstream area 111, 211 of the patterns can be initially greater than 0.4 mm, for example between 0.4 mm and 0.2 mm.

The depth of the upstream area 111, 211 of the patterns then varies to reach the depth of the downstream area between 0.05 mm and 0.2 mm.

Moreover, the inner surface of the inner ring segment may comprise, between the non-hollowed-out portion 44 and its downstream edge 18, a hollowed-out space 46.

Preferably, the hollowed-out space 46 forms a chamfer, i.e. its depth increases.

This embodiment makes it possible to reduce the pressure heterogeneity at the seal exit.

As discussed above, the patterns are of longilineal shape, and are diagonal with respect to the axial direction DA, i.e. have an inclination of angle $\alpha$ to this direction.

This embodiment improves the behavior of the seal by aligning the direction of the patterns with the direction of the incident air flow traversing the seal.

In practice, the incident air flow traversing the seal is generally not aligned with the axial direction, but has a non-zero tangential velocity, since the flat surface opposite the seal is rotated in the circumferential direction $D_C$.

In an embodiment, the angle of inclination a is between 30° and 90° or between 30° and 60°, with a best value between 30° and 45°.

The dimensions of the different elements are also shown on FIG. 5 for an embodiment comprising first patterns 100 and second patterns 200 only, i.e. no third patterns as described above.

Preferably, the first patterns and the second patterns alternate and number between 3 and 10 repetitions of a first and of a second pattern in the circumferential direction.

These dimensions have been identified as optimal for an even more improved operation of the seal.

As above, a dimension is expressed with respect to the width of the inner surface of the inner ring segment travelled in the direction of the length of the patterns, this expression having the same meaning as previously.

$L_0$ shows on FIG. 5 that which is understood by "the width of the inner surface of the inner ring segment travelled in the direction of the length of the patterns".

$L_1$ corresponds to the length of the upstream area of the patterns which is in an embodiment between 5% and 15% of the width of the inner surface of the inner ring segment travelled in the direction of the length of the patterns.

$L_3$ represents the width, in the circumferential direction $D_C$ of the first part 201 of the second pattern 200. In an embodiment, $L_3$ can be less than or equal to 1 cm, for example between 0.3 cm and 1 cm.

$L_4$ represents the width, in the circumferential direction $D_C$ of the first pattern 100. In an embodiment, $L_4$ may be between 50% and 85% of the width $L_3$.

$L_6$ represents the length of the downstream area of the first part 201 of the second pattern 200. In an embodiment, $L_6$ may be between 75 and 85% of the width $L_0$ of the inner surface of the inner ring segment travelled in the direction of the length of the patterns.

$L_7$ represents the length of the downstream area of the first pattern 100. In an embodiment, $L_7$ may be between 50 and 85% of the length $L_6$.

$L_9$ represents the dimension of extension of the second part 202 of the second pattern 200 in the direction of the length of the patterns. In an embodiment, $L_9$ may be between 30% and 50% of the length $L_3$.

$L_{10}$ generally represents the smallest dimension of a non-hollowed-out portion separating two patterns. Preferably, this dimension $L_{10}$ is less than or equal to 0.2 mm.

As shown on FIG. 5, $L_{10}$ is understood as the circumferential direction for the non-hollowed-out portions, of which the greatest direction of extension is aligned with the patterns, and in the direction of the patterns for the non-hollowed-out portions, of which the greatest direction of extension is along the circumferential direction.

$M_0$ represents the width in the circumferential direction of an inner ring segment.

$M_2$ represents the width, in the circumferential direction, of a second pattern 200.

This width $M_2$ is preferably less than a third of the width $M_0$. In other words, in an embodiment, there are at least three second patterns 200 over the inner surface $S_{int}$ of an inner ring segment 13.

Preferably $M_2$ is between a third and a tenth of the width $M_0$.

FIG. 6 describes a different embodiment from that of FIG. 5, and in which the inner surface of the inner ring segments further comprises third patterns 300.

The identical reference numbers in the figure refer to elements already described for FIG. 5, even though they are not exactly positioned in the same place or are of different dimensions.

The third patterns 300 comprise a first part 301 and a second part 302.

The first part 301 of the third pattern 300 extends between the upstream edge 17 of the inner ring segment 13 and a fourth non-hollowed-out portion 44 the inner surface of the inner ring segment closer to the downstream edge 18 of the inner ring segment than the second non-hollowed-out portion 42.

Moreover, the first part 301 of the second pattern 300 is separated from the second pattern 200 in the circumferential direction by a fifth non-hollowed-out portion 45 of the inner surface of the inner ring segment.

Moreover, the second part 302 of the third pattern 300 is, in the axial direction, separated from the second part 202 of the second pattern 200 by the second non-hollowed-out portion 42.

In an embodiment, which is that shown on FIG. 6, the second part 302 of the third patterns 300 extends in the circumferential direction $D_C$ all the way to the continuation of the circumferential end of the first pattern 100.

Specifically, the width of the non-hollowed-out portion 27 between the first pattern 100 (or the second part 202 of the second pattern 200) and the circumferentially adjacent pattern is equal to the width of the non-hollowed-out portion 27 between the second part 302 of the third pattern 300 and the circumferentially adjacent pattern.

In other words, the second portion 302 of the third pattern is a portion coming axially downstream of the entirety of the second part 202 of the second pattern 200.

FIG. 6 moreover shows, in dotted lines, the separation between the upstream area 111 and the downstream area 112 of the first patterns 100, between the upstream area 211 and the downstream area 212 of the second patterns 200 and between the upstream area 311 and the downstream area 312 of the third patterns 300.

In an embodiment the depth of this upstream area decreases between the upstream edge 17 and the downstream area of the patterns where the depth remains constant.

For example, the depth of the upstream area 111, 211, 311 of the patterns can be initially greater than 0.4 mm, for example between 0.4 mm and 0.2 mm.

The depth of the upstream area 111, 211, 311 of the patterns then varies to reach the depth of the downstream area between 0.05 mm and 0.2 mm.

Moreover, the inner surface of the inner ring segment may comprise, between the non-hollowed-out portion 44 and its downstream edge 18, a hollowed-out space 46.

Preferably, the hollowed-out space 46 forms a chamfer, i.e. its depth increases.

This embodiment makes it possible to reduce the pressure heterogeneity at the seal exit.

For example, its depth increases to a depth greater than or equal to 0.2 mm.

The dimensions of the different elements are also shown on FIG. 6 for an embodiment comprising first 100, second 200 and third 300 patterns.

These dimensions have been identified as optimal for a still improved operation of the seal.

As seen above a dimension is expressed with respect to the width of the inner surface of the inner ring segment travelled in the direction of the length of the patterns, this expression having the same meaning as previously.

$L_0$ represents on FIG. 6 that which is understood by "the width of the inner surface of the inner ring segment travelled in the direction of the length of the patterns".

$L_1$ corresponds to the length of the upstream area of the patterns which is in an embodiment between 5% and 15% of the width of the inner surface of the inner ring segment travelled in the direction of the length of the patterns.

$L_2$ represents the width, in the circumferential direction $D_C$ of the first part 301 of the third pattern 300. In an embodiment, $L_2$ can be less than or equal to 1 cm, for example between 0.3 cm and 1 cm.

$L_3$ represents the width, in the circumferential direction $D_C$, of the first part 201 of the second pattern 200. In an embodiment, $L_3$ may be between 85% and 95% of the width $L_2$.

$L_4$ represents the width, in the circumferential direction $D_C$ of the first pattern 100. In an embodiment, $L_4$ may be between 75% and 85% of the width $L_2$.

$L_5$ represents the length of the downstream area of the first part 301 of the third pattern 300. In an embodiment, $L_5$ may be between 75 and 85% of the width $L_0$ of the inner surface of the inner ring segment travelled in the direction of the length of the patterns.

$L_6$ represents the length of the downstream area of the first part 201 of the second pattern 200. In an embodiment, $L_6$ may be between 85 and 95% of the length $L_5$.

$L_7$ represents the length of the downstream area of the first pattern 100. In an embodiment, $L_7$ may be between 75 and 85% of the length $L_5$.

$L_8$ represents the dimension of extension of the second part 302 of the third pattern 300 in the direction of the length of the patterns. In an embodiment, $L_8$ may be between 30% and 50% of the length $L_2$.

$L_9$ represents the dimension of extension of the second part 202 of the third pattern 200 in the direction of the length of the patterns. In an embodiment, $L_9$ may be between 30% and 50% of the length $L_3$.

$L_{10}$ generally represents the smallest dimension of a non-hollowed-out portion separating two patterns. Preferably, this dimension $L_{10}$ is less than or equal to 0.2 mm.

$M_0$ represents the width in the circumferential direction of an inner ring segment.

$M_1$ represents the width, in the circumferential direction, of a third pattern 300. This width is preferably less than a third of the width $M_0$. Put still otherwise, in an embodiment, there are at least three patterns 300 on the inner surface $S_{int}$ of an inner ring segment 13.

Preferably, the first patterns, the second patterns and the third patterns are alternated and number between 3 and 10 repetitions of a first and a second pattern, then of a third pattern in the circumferential direction.

Preferably $M_1$ is between a third and a tenth of the width $M_0$.

$M_2$ represents the width, in the circumferential direction, of a second pattern 200. This width is preferably between 50 and 70% of $M_1$.

FIG. 7 shows a portion of the turbomachine visible on FIG. 1, and illustrates that this latter may be provided with seals in accordance with those described above.

In the embodiment shown, the turbomachine portion has three seals: a forward inner seal 62 (FIS), a forward outer seal 63 (FOS) and a first seal downstream of the high-pressure compressor 61 (CDP).

Such seals are now described in relation with FIG. 7 which is only one example of a configuration for a path for cooling the air in a turbomachine, and those skilled in the art will be able to identify a forward outer seal 63 (FOS) a forward inner seal 62 (FIS), and a first seal 61 downstream of a high-pressure compressor (CDP) in other geometries of the cooling circuit.

FIG. 7 shows a diagram of a cooling circuit of a turbomachine.

In the embodiment shown, air is drawn off downstream of the last compressor disc 401 and also below the combustion chamber 5.

The air drawn off downstream of the last compressor disc 401 first traverses the seal 61, which is located radially under the inlet of the combustion chamber 5.

The seal 61 defines the amount of air for the cooling circuit 401 drawn off downstream of the last disc of the high-pressure compressor 4.

The air drawn off below the combustion chamber can for example be drawn through an air orifice, opening into a housing between the forward outer seal 63 and the forward inner seal 62.

On FIG. 7, these two seals respectively delimit the entrance and the exit of such a housing.

The seal 62 is traversed by the air coming from the high-pressure compressor 401 seeking to enter this housing, and whether it then serves the cooling circuit 82 or is intended for the bleed circuit 81.

The seal 63 itself delimits the exit of the air intake housing, and limits the air flow meeting the bleed circuit 81.

For example, the seal 62 can be located under the air intake orifice, while the seal 63 may be located under the first nozzle guide vane of the high-pressure turbine 701.

On FIG. 7, the bleed circuit opens out between the high-pressure nozzle guide vane 701 and the first high-pressure rotor blade 702.

In the embodiment shown, it will be noted that the surface opposite the seals 62 and 63 is an outer surface of a stage of the rotor of the high-pressure turbine.

FIG. 7 shows a turbine for which the three particular seals 61, 62, 63 are as described above but it does not depart from the scope of the invention if only one of these seals is as described above.

In the remainder of the text, the seal 61 will be described, but it should be noted that what is described for this seal is also applicable to the other seals.

In an embodiment, which is that shown, the surface 500 opposite the seal comprises a groove filled with a resin 51.

This embodiment makes it possible to ensure that under abnormal operation, and if it were to come into contact with the surface opposite the seal, the inner surface of the seal does not damage the surface 500 itself but only the resin 51.

Moreover, the resin 51 can be clear, which thus allows an even more simplified inspection insofar as the surface 500 is visible under the resin and one may visually observe, without having to remove the resin, whether or not the use of the seal has caused any degradation of the opposite surface 500.

In an embodiment, the surface 500 opposite the seal, whether or not it is provided with a groove and resin 51, can be connected with a flyweight 58.

This embodiment ensures that the surface opposite the seal 500 remains flat throughout the operation of the seal and minimizes the risk of the inner ring segment 13 of the seal coming into contact with the opposite surface 500.

On FIG. 7, the air flow traversing the seals is depicted on the figures by arrows, and the axis A of the turbomachine is also present.

FIG. 7 shows how the air 401 drawn off at the outlet of the high-pressure compressor 4 may reach a movable blade 702 of the hot part of the turbomachine, here of the high-pressure turbine 6, disposed after the combustion chamber 5. In an alternative mode, the air can also go back out of the cooling circuit through the bleed outlet 81, after traversing the forward outer seal 62 and the rear outer seal 63.

A part of the cooling air passes via the path 82 to be injected directly into the cooling circuit of a movable blade 702 of the hot part of the turbomachine, here a movable blade 702 of the high-pressure turbine.

The bleed outlet of the cooling circuit is here located between a fixed blade 701 and a movable blade 702 of the high-pressure turbine 6.

FIG. 7 also illustrates that the surface 500 opposite the seal can be a surface of a rotor mounted rotatably about the axis A. For example, the surface 500 can be a surface of the rotor of the high-pressure turbine 6.

The invention claimed is:

1. A seal configured to provide a predefined clearance between said seal and an outer surface of a rotor mounted rotatably about an axis A disposed opposite the seal, the axis A defining an axial direction, the seal extending circumferentially around the axis A and comprising a plurality of seal segments circumferentially distributed around the axis A, each seal segment comprising an inner ring segment connected to an outer ring segment by a return member, the seal being characterized in that the inner surface of each inner ring segment comprises a plurality of patterns hollowed out from the inner surface of the inner ring segment, the plurality of patterns comprising at least:

a first pattern having a longilineal shape extending along a diagonal direction with respect to the axial direction from an upstream edge of the inner ring segment and all the way to a first non-hollowed-out portion of the inner surface of the inner ring segment; and a second pattern comprising a first part extending along the same diagonal direction as the first pattern from the upstream edge of the inner ring segment and all the way to a second non-hollowed-out portion of the inner surface of the inner ring segment axially closer to a downstream edge of the inner ring segment than the first non-hollowed-out portion, the first part of the second pattern being separated in the circumferential direction from the first pattern by a third non-hollowed-out-portion of the inner surface of the inner ring segment, the second pattern further comprising a second part extending along the circumferential direction between the first non-hollowed-out portion and the second non-hollowed-out portion of the inner surface of the inner ring segment.

2. The seal as claimed in claim 1, wherein the inner surface of the inner ring segment further comprises at least a third pattern comprising a first part extending along the same diagonal direction as the first pattern from the upstream edge of the inner ring segment and all the way to a fourth non-hollowed-out portion of the inner surface of the inner ring segment axially closer to the downstream edge of the inner ring segment than the second non-hollowed-out portion, the first part of the third pattern being separated in the circumferential direction from the first part of the second pattern by a fifth non-hollowed-out portion of the inner surface of the inner ring segment, the third pattern further comprising a second part extending along the circumferential direction between the second non-hollowed-out portion and the fourth non-hollowed-out portion of the inner surface of the inner ring segment.

3. The seal as claimed in claim 1, wherein each pattern comprises a flat downstream pattern area of constant and non-zero depth and an upstream pattern area in which the depth varies decreasingly, while remaining greater than the constant depth of the downstream pattern area.

4. The seal as claimed in claim 3, wherein the upstream pattern area of each pattern has a rounded shape.

5. The seal as claimed in claim 1, wherein each pattern extends along the diagonal direction, the diagonal direction having an angle of inclination with respect to the axial direction, the angle of inclination being greater than or equal to 30°.

6. The seal as claimed in claim 1, wherein the outer ring segments form an outer shroud and the inner ring segments have circumferential ends arranged end-to-end in the circumferential direction around the axis A and wherein each circumferential end of an inner ring segment has an angle of inclination with respect to the circumferential direction between 30° and 90°.

7. The seal as claimed in claim 1, wherein the plurality of seal segments comprises between 5 and 20 seal segments.

8. The seal as claimed in claim 1, further comprising a secondary sealing member radially disposed above the inner ring segment so as to prevent air from axially traversing the seal radially above the inner ring segment.

9. An aeronautical turbomachine comprising at least one seal as claimed in claim 1.

10. The aeronautical turbomachine as claimed in claim 9, comprising a circuit for conveying cooling air toward a high-pressure rotor disc, the circuit for conveying cooling air comprising the at least one seal, said circuit for conveying cooling air comprising an inlet drawing off air downstream of a last disc of a high-pressure compressor, an inlet drawing off air radially under a combustion chamber and an air outlet opening into a cooling housing of the high-pressure rotor disc and the at least one seal being disposed at one from among the following positions:

downstream of the inlet drawing off air from the high-pressure compressor, radially under a last straightener of the high-pressure compressor;

radially below an injector of cooling air in fluid communication with the inlet drawing off air radially under the combustion chamber;

radially between the injector and a root of a high-pressure nozzle guide vane and disposed such as to prevent a leak of the air intended to cool the high-pressure rotor disc.

11. The aeronautical turbomachine as claimed in claim 10, wherein the seal is disposed downstream of the inlet drawing off air from the high-pressure compressor, radially under the last straightener of the high-pressure compressor and the surface opposite said seal comprises a groove filled with a clear resin.

* * * * *